Jan. 4, 1927.
G. E. VALBERG
1,612,955
NUT LOCKING WASHER
Filed Nov. 18, 1925
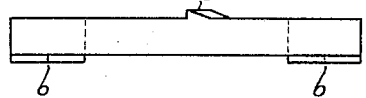
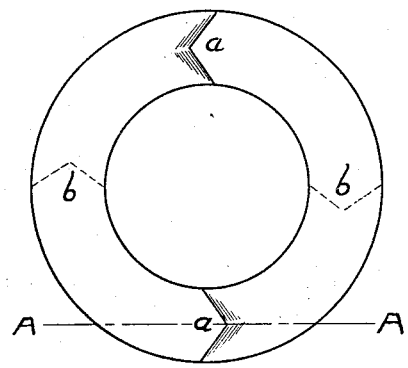
Inventor
Gustaf Einar Valberg Patented Jan. 4, 1927.

1,612,955

UNITED STATES PATENT OFFICE.

GUSTAF EINAR VALBERG, OF STOCKHOLM, SWEDEN.

NUT-LOCKING WASHER.

Application filed November 18, 1925, Serial No. 69,843, and in Sweden November 24, 1924.

This invention relates to an improved nut-locking washer; and the objects of my invention are to provide a washer that is inexpensive to manufacture; that possesses sufficient springiness to ensure a safe grip of the nut upon the threads of the bolt; and that at the same time is provided with means for rendering difficult the loosening of the nut without preventing its being tightened.

A nut-locking washer according to my invention is illustrated by way of example in the accompanying drawing, in which:

Fig. 1 shows a side elevation of the washer;

Fig. 2 shows a plan view of the washer; and

Fig. 3 shows a vertical section through the washer upon the line A—A in Fig. 2.

The washer consists of a flat ring having on one face thereof a pair of piercing barbs $a$ opposite each other and on the other face another pair of piercing barbs $b$ opposite each other. The latter pair of piercing barbs is arranged at right angles with respect to the former pair of piercing barbs. All the piercing barbs are of the same shape.

The piercing barbs $a$ and $b$ extend entirely across the washer and are given a peculiar shape adapted for rendering far more resistance when loosening than when tightening the nut.

For this purpose each piercing barb is given a V-shaped form in a horizontal direction. In a vertical direction one side of the piercing barb is steeply inclined towards the face of the washer, while its other side has a comparatively slight incline (Fig. 3).

The point of the piercing barb and the slightly inclined side of the same are on both sides of the washer turned in such a direction that they when tightening the nut penetrate into the nut and the sub-structure respectively. The slightly inclined side of the piercing barb thereby pushes the impeding material slightly before it. When loosening the nut, however, the opposite steep side of the piercing barb will stow up the material in such a way that the resistance against the loosening will be greatly increased.

The piercing barbs can be modified from the shown form in several ways. The outlines of the V-shaped piercing barbs may be formed by curved lines instead of by straight lines, both in the horizontal and in the vertical direction. The size of the angle may be varied. More than two piercing barbs may be provided on each face of the washer, the piercing barbs on one face being still arranged offset in relation to the piercing barbs on the opposite face. A certain spring action would then still be reached. By uneven surface of the sub-structure, however, the forces would be unevenly divided upon the different piercing barbs, which is not the case with washers provided only with one pair of piercing barbs on each side. In the latter case the forces will be evenly distributed upon the piercing barbs, as the washer automatically adjusts itself in a torsional way by turning about the lines through the piercing barbs.

I claim:

A nut-locking device comprising a complete annular washer having a pair of piercing barbs diametrically opposed on each side of the washer, the piercing barbs of one side being arranged at right angles with respect to the pair of piercing barbs on the other side; the said piercing barbs being substantially V-shaped or of angular form in a direction parallel to the surface of the washer, with one side steeply and the other slightly inclined towards the face of the washer; the points of the piercing barbs and their slightly inclined sides being turned in such a direction that they penetrate into the material of the nut and the sub-structure when tightening the nut, while the steep sides of the piercing barbs have a considerable radial extent across the washer and are so shaped that they force up the material when loosening the nut and increase the resistance against the loosening.

In witness whereof I have hereunto set my hand.

GUSTAF EINAR VALBERG.